United States Patent Office 3,487,104
Patented Dec. 30, 1969

3,487,104
PROCESS FOR PREPARING ALKENE SULFONATES
Harold L. Dimond, Ross Township, Allegheny County, Daniel J. Hurley, Oakmont, and Vincent J. Pascarella, Erie, Pa., assignors to Gulf Research & Development Company, Pittsburgh, Pa., a corporation of Delaware
No Drawing. Filed Apr. 28, 1966, Ser. No. 545,859
Int. Cl. C07c 143/16
U.S. Cl. 260—513   4 Claims

ABSTRACT OF THE DISCLOSURE

A process for preparing a basic alkene sulfonate which involves reacting a sultone obtained as a result of the sulfonation of an alpha olefin having at least ten carbon atoms with an alkoxide of the following formula:

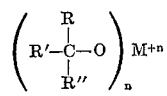

wherein R and R' can be hydrogen, an alkyl or aryl radicals, R' can be alkyl or aryl radicals, M is an alkali or alkaline earth metal and $n$ is the oxidation state of the metal.

---

This is a continuation-in-part application of our application Ser. No. 473,853 filed July 21, 1965, now abandoned entitled, "Process And Composition," and assigned to the same assignee as the present application.

This invention relates to a process for preparing a basic alkene sulfonate.

Olefins, such as alpha olefins, can be reacted with gaseous $SO_3$ in the manner set forth in application Ser. No. 460,513, filed June 1, 1965, in the names of Harold L. Dimond and Vincent J. Pascarella to produce a mixture of sultones and unsaturated sulfonic acids. From this mixture the sultones, which can amount to 60 to 70 percent by weight of said mixture, can be recovered in any convenient manner, for example, by recrystallization from methanol. Sultones can also be prepared by dehydration of hydroxysulfonic acids, dehydrohalogenation of halosulfonic acids, treatment of olefins with dioxane $SO_3$, etc.

We have found that when such sultones are normally treated with a basic reagent in accordance with the procedure of the aforesaid application, for example, with an organic base, such as the sodium salt of methanol, or an inorganic base, such as sodium hydroxide, a mixture containing basic alkene sulfonates and basic hydroxy sulfonates is obtained. This can result in the production of unwanted or undesired basic sulfonates. Since the separation of basic sulfonates from each other is so difficult, and in some cases almost impossible at the present time, it is apparent that the recovery of a desired basic sulfonate from the mixture of basic sulfonates presents a formidable problem.

We have found that by treating a sultone, such as defined above, with a selected alkoxide not only will the basic alkene yield be raised to the extent that it is almost the sole product produced but desirably and unexpectedly primarily a single basic alkene sulfonate will be produced. In all cases at least about 90 percent by weight of the basic alkene sulfonates produced will be a single isomer, but in most cases at least about 95 percent by weight of the basic alkene sulfonates produced will be a single isomer. Although it is not certain, it is possible that during the reaction between the sultone and the alkoxide, a hydrogen is abstracted from one of the two carbon atoms which are alpha to the carbon atom joined with the oxygen of the sultone ring. Subsequent ring opening produces a single isomer. This is surprising because it would be expected that at least some product would arise by hydrogen abstraction from each of the two alpha carbons.

As pointed out above, the sultone treated herein can be obtained in any suitable manner. By "sultone" we mean to include a hydrocarbon compound having from 10 to 22 carbon atoms in the molecule, having the functional group —O—$SO_2$— attached to different carbons thereof. Representative sultones that can be treated herein include 1-undecanesulfonic acid-3-hydroxy sultone, 1-nonadecanesulfonic acid-3-hydroxy sultone, etc.

The alkoxide that can be employed to react with the sultone in accordance with the procedure defined herein can be presented by the following general formula:

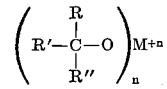

wherein R and R', the same or different, can be hydrogen, alkyl or aryl radicals as defined by R", and R" can be alkyl radicals having from one to 20 carbon atoms, preferably from one to five carbon atoms, such as methyl, ethyl-n-propyl, isopropyl, n-butyl, isobutyl, t-butyl, cyclobutyl, n-pentyl, isopentyl, t-pentyl, cyclopentyl, n-hexyl, isohexyl, t-hexyl, cyclohexyl, n-heptyl, isoheptyl, t-heptyl, cycloheptyl, n-octyl, isooctyl, t-octyl, cyclooctyl, n-nonyl, isononyl, t-nonyl, cyclononyl, n-decyl, isodecyl, t-decyl, n-undecyl, isoundecyl, t-undecyl, n-dodecyl, isododecyl, t-dodecyl, n-tridecyl, isotridecyl, t-tridecyl, n-tetradecyl, isotetradecyl, t-tetradecyl, n-pentadecyl, isopentadecyl, t-pentadecyl, n-hexadecyl, isohexadecyl, t-hexadecyl, n-octadecyl, isooctadecyl, t-octadecyl, n-nonadecyl, isononadecyl, t-nonadecyl, n-eicosyl, isoeicosyl, t-eicosyl, sec-butyl, neopentyl, 2-methyl-2-butyl, 3-methyl-2-butyl, 2-hexyl, 2-methylpentyl, 3-methylpentyl, 3-pentyl, 2-pentyl, 2-methylhexyl, 3-methyl-2-pentyl, 3-methyl-3-pentyl, 2,3-dimethylbutyl, 2,2-dimethylbutyl, 3,3-dimethylbutyl, 3-hexyl, 2-ethylbutyl, 2-methylbutyl, 3-methylhexyl, 2,2-dimethylpentyl, 2,3-dimethylpentyl, 2,4-dimethylpentyl, 3,3-dimethylpentyl, 3-ethylpentyl, 4-methylhexyl, 2,2,3-trimethylbutyl, 2,3,3-trimethylbutyl, 3,4-dimethyl-2-pentyl, 2,3-dimethyl-2-pentyl, 2,4-dimethyl-2-pentyl, 2,2-dimethyl-3-pentyl, etc., or aryl radicals having from six to 18 carbon atoms, preferably from six to nine carbon atoms, such as 2-methylphenyl, 3-methylphenyl, 4-methylphenyl, 2-ethylphenyl, 3-ethylphenyl, 4-ethylphenyl, 2-n-propylphenyl, 3-n-propylphenyl, 4-n-propylphenyl, 2,3-dimethylphenyl, 2,4-dimethylphenyl, 2,5-dimethylphenyl, 2,6-dimethylphenyl, 2-ethyl-3-methylphenyl, 2-ethyl-4-methylphenyl, 2-ethyl-5-methylphenyl, 2-ethyl-6-methylphenyl, 2-isopropylphenyl, 3-isopropylphenyl, 4-isopropylphenyl, naphthyl, biphenyl, terphenyl, anthracyl, phenanthryl, benzyl, cumyl, alpha-methylbenzyl, etc.; M is an alkali or an alkaline earth metal selected from the group consisting of lithium, sodium, potassium, magnesium, calcium, strontium and barium and $n$ is the oxidation state of said metal. Examples of alkoxides that can be employed include sodium ethoxide, sodium-n-propoxide, sodium-n-butoxide, sodium-2-methyl-2-propoxide, sodium-2-methyl-2-butoxide, sodium-3-methyl-3-pentoxide, sodium-3,3-diethyl-1-pentoxide, sodium-2-methyl-2-pentoxide, sodium-3-methyl-3-hexoxide, sodium-3-ethyl-3-hexoxide, sodium-4-methyl-4-heptoxide, sodium-2,3-dimethyl-3-hexoxide, sodium-4-ethyl-4-heptoxide, sodium-4-n-propyl-4-heptoxide, sodium-2-methyl-3-isopropyl-3-hexoxide, sodium-5-n-butyl-5-decoxide, sodium-3-methyl-4-tertiarybutyl-4-nonoxide, sodium-9,9-ditertiarybutyl-6-dodecoxide, sodium-2-cyclohexyl-3-methyl-2-butoxide, sodium-2-phenyl-2-propoxide, sodium-2-methyl-3-alpha-naphthyl-2-butoxide, sodium-3-phenyl-2-propoxide, sodium-2-p-biphenyl-2-hexoxide, sodium-2-propoxide, sodium-2-butoxide, sodium-2-pentoxide, sodium-2-hexoxide, sodium-2-heptoxide, sodium-2-octoxide, sodium- 2-decoxide, sodium-2-tetradecoxide, sodium-2-octadecoxide, sodium-2-docosoxide, sodium-2-hexacosoxide, sodium-2,2-dimethyl-4-heptoxide, sodium 2,2,4,4-tetramethyl-3-pentoxide, sodium -2-methyl-4-ethyl-3-hexoxide, sodium-1-phenyl-2-butoxide, sodium-3-benzyl-2-pentoxide, sodium-1-alphanaphthyl-ethoxide, etc. In addition to the above, we can also substitute for the sodium any of the alkali metals or alkaline earth metals named hereinabove.

The reaction between the sultone and the alkoxide is relatively simple. The sultone is placed in a reactor with about equal molar amounts thereof of the alkoxide, preferably in a solution of an alcohol corresponding to the alkoxide. The mixture is stirred while it is maintained at a temperature of about 50° to about 200° C., preferably at a temperature of about 75° to about 150° C., and a pressure of about atmospheric to about 1000 pounds per square inch gauge, preferably a pressure of about atmospheric to about 250 pounds per square inch gauge, for about two minutes to about 6000 minutes, preferably for about 240 minutes to about 480 minutes. The desired alkene sulfonate can be recovered in any suitable manner from the reaction mixture, for example, by evaporation, spray drying, filtering and then drying, etc. Preferably, the basic alkene sulfonate is recovered by drum drying the reaction mixture at a temperature of about 100° to about 250° C., preferably at a temperature of about 110° to about 200° C.

The basic alkene sulfonate recovered can be employed as a surface-active agent, detergent, foaming agent, emulsifier, chemical intermediate, analytical standard, etc.

The invention can further be illustrated by the following.

EXAMPLE I

Into a reactor having an internal diameter of 0.75 inch and a length of 22 feet there was flowed over a period of 1.2 hours and at a constant rate 2.91 pound of a mixture containing 96.5 percent by weight of hexadecene-1. The alpha olefin was permitted to flow downwardly in the reactor at atmospheric pressure as a film on the inner walls thereof. At the same time there was introduced at a constant rate into the reactor onto the alpha olefin film a gaseous mixture composed of 1.028 pounds of $SO_3$ as a five percent volume mixture in dry air. The reaction zone was maintained at a temperature of about 90 to about 100° C. by indirect contact with cooling water. The reaction between the $SO_3$ and olefin was rapid and the resultant sulfonated product, which was slightly viscous, was permitted to flow along the inner wall of the reactor and was recovered, after the escape of unreacted gas and nitrogen therefrom, in a receiver.

The reaction product was placed in a flask together with excess methanol. The mixture was warmed until a clear solution was obtained. The solution was filtered hot and the volume thereof was reduced by permitting some of the alcohol to boil off in an open container on a steam bath. The solution began to get cloudy, and methanol was added to the solution, while hot, until it became clear again. The solution was then taken off the steam bath, covered and permitted to cool to room temperature. The sultone crystallized out and had a purple cast. It was recovered by filtration.

110 grams of the $C_{16}$ sultone, 34.2 grams of sodium tertiary butoxide and 368 grams of tertiary butyl alcohol were heated together, while stirring, at a temperature of 82° C. and atmospheric pressure for 102 hours. The resulting product was drum dried at a temperature of 135° C. and was recrystallized four times from hot methanol. Bromine number determination showed the product to be 100 percent monoloefin. Coulometric titration proved the product to be 99 percent internal olefin. Periodate oxidation, followed by chromatographic analysis of the isolated acid product, indicated that the double bond was between the gamma and delta carbon atoms. Elemental analysis for a $C_{16}$ sulfonate showed the following.

Calculated: C, 58.85; H, 9.57; S, 9.84. Found: C, 58.74; H, 9.54; S, 10.02. The above clearly shows that the compound obtained is the single isomer

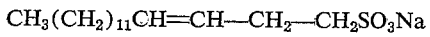

EXAMPLE II

There was charged to a reactor 500 milliliters of isopropyl alcohol and, over a two-hour period at atmospheric pressure and a temperature of 70° C., 8.2 grams of sodium metal to produce sodium isopropoxide. To this there was then added 110 grams of the $C_{16}$ sultone prepared in Example I, and the mixture was refluxed at 82° C. for 140 hours. The mixture was filtered and the filtrate was evaporated to dryness. Two hot washes with 200 milliliter portions of methyl ethyl ketone and two washes with hot 200 milliliter portions of acetone produced 94.1 grams of product (80.8 percent yield). Two recrystallizations from methanol followed by two more hot washes with methyl ethyl ketone, and two with hot acetone, as above, gave a product which analyzed as follows: Coulometric titration indicated 98.8 percent internal olefin. Periodate oxidation, followed by gas chromatographic analysis of the isolated acids, indicated 92.4 percent gamma-delta olefin present and 7.6 percent delta-epsilon olefin present. Elemental analysis for a $C_{16}$ sulfonate showed the following.

Calculated: C, 58.85; H, 9.59; S, 9.84. Found: C, 58.76; H, 9.90; S, 9.76. The above clearly shows that the main compound obtained is the single isomer

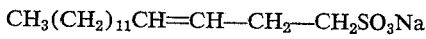

The delta-epsilon compound obtained has the following structure:

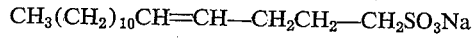

EXAMPLE III

In this run, as well as in Example IV, which follows, a $C_{14}$ sultone was employed. This sultone was prepared in the same manner as that described for the preparation of the $C_{16}$ sultone above, with the exception that a $C_{14}$ normal alpha olefin was employed in place of a $C_{16}$ normal alpha olefin. There was charged to a stirred reactor five hundred milliliters of n-butyl alcohol. To the alcohol there was added slowly 8.3 grams of sodium metal. After the sodium had completely reacted with the alcohol to form sodium n-butoxide, 99.6 grams (0.36 mol) of the $C_{14}$ sultone was added, and the mixture was refluxed at 118° C. for 115 hours. The mixture was cooled and a precipitate formed. The precipitate was washed with methyl ethyl ketone and acetone successively. The product was recrystallized from methanol and dried at 90° C. under vacuum and gave a product which analyzed as follows: Coulometric titration indicated 96 per cent internal olefin. Periodate oxidation, followed by gas chromatographic analysis of the isolated acids, indicated 96 percent gamma-delta olefin and four percent delta-epsilon olefin present. The above clearly shows that the main compound obtained is the single isomer.

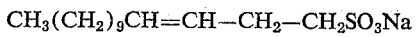

The delta-epsilon compound obtained has the following structure:

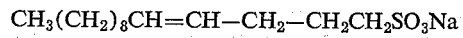

EXAMPLE IV

There was charged to a stirred reactor 500 milliliters of ethanol. To the alcohol there was added slowly 8.3 grams of sodium metal. After the sodium had completely reacted with the alcohol to form sodium ethoxide, 99.6 grams (0.36 mol) of the $C_{14}$ sultone was added, and the mixture was refluxed at 81° C. for 140 hours. The express alcohol was removed in a rotating evaporator and 109.9 grams of product was recovered. The product was recrystallized from methanol. Periodate oxidation, followed by gas chromatographic analyses of the isolated acids, indicated 91 percent gamma-delta olefin, 3.8 percent delta-epsilon olefin and 4.0 of beta-gamma isomer. The above clearly shows that the main compound obtained is the single isomer

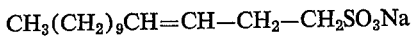

We have treated sultones similar to the $C_{16}$ sultone described above with sodium hydroxide, sodium methoxide and sodium metal, and in each instance we have noted that the basic reaction product produced contained mixtures of basic alkene sulfonates as well as basic hydroxy sulfonates.

We claim:

1. A process for preparing a product predominating in a basic alkene sulfonate which comprises reacting a sultone having 16 carbon atoms, obtained as a result of the sulfonation of hexadecene-1 with $SO_3$, with sodium tertiary butoxide at a temperature of about 50° to about 200° C. and a pressure of about atmospheric to about 1000 pounds per square inch guage for about two to about 6000 minutes.

2. A process for preparing a product predominating in a basic alkene sulfonate which comprises reacting a sultone having 16 carbon atoms, obtained as a result of the sulfonation of hexadecene-1 with $SO_3$, with sodium isopropoxide at a temperature of about 50° to about 200° C. and a pressure of about atmospheric to about 1000 pounds per square inch gauge for about two to about 6000 minutes.

3. A process for preparing a product predominating in a basic alkene sulfonate which comprises reacting a sultone having 14 carbon atoms, obtained as a result of the sulfonation of tetradecene-1 with $SO_3$, with sodium n-butoxide at a temperature of about 50° to about 200° C. and a pressure of about atmospheric to about 1000 pounds per square inch gauge for about two to about 6000 minutes.

4. A process for preparing a product predominating in a basic alkene sulfonate which comprises reacting a sultone having 14 carbon atoms, obtained as a result of the sulfonation of tetradecene-1 with $SO_3$, with sodium ethoxide at a temperature of about 50° to about 200° C. and a pressure of about atmospheric to about 1000 pounds per square inch gauge for about two to about 6000 minutes.

References Cited

UNITED STATES PATENTS

| | | |
|---|---|---|
| 3,346,628 | 10/1967 | Riezebos et al. |
| 3,346,629 | 10/1967 | Broussalian et al. |
| 3,164,608 | 1/1965 | Blaser. |
| 3,235,549 | 2/1966 | Broussalian _____ 260—513 |

FOREIGN PATENTS

| | | |
|---|---|---|
| 1,064,169 | 4/1967 | Great Britain. |
| 743,570 | 4/1954 | Germany. |
| 867,396 | 2/1953 | Germany. |

OTHER REFERENCES

Bordwell et al.: J. Am. Chem. Soc. 81 (Apr. 20, 1959), pp. 1995–2000.

DANIEL D. HORWITZ, Primary Examiner

UNITED STATES PATENT OFFICE
CERTIFICATE OF CORRECTION

Patent No. 3,487,104            December 30, 1969

Harold L. Dimond et al.

It is certified that error appears in the above identified patent and that said Letters Patent are hereby corrected as shown below:

Column 2, line 22, "ethyl-" should read -- ethyl, --.

Signed and sealed this 7th day of July 1970.

(SEAL)
Attest:

Edward M. Fletcher, Jr.          WILLIAM E. SCHUYLER, JR.
Attesting Officer               Commissioner of Patents